INVENTOR.
GEORGE KOCULYN

Sept. 20, 1966 G. KOCULYN 3,273,579
HYDRAULIC MECHANISM INCLUDING PILOT CONTROL RESPONSIVE TO
ATMOSPHERIC CONDITIONS
Original Filed May 15, 1961 3 Sheets-Sheet 2
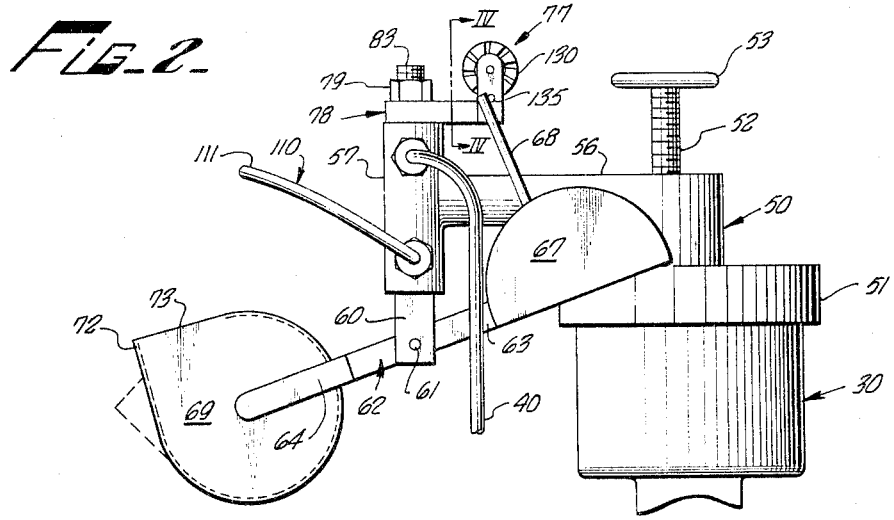
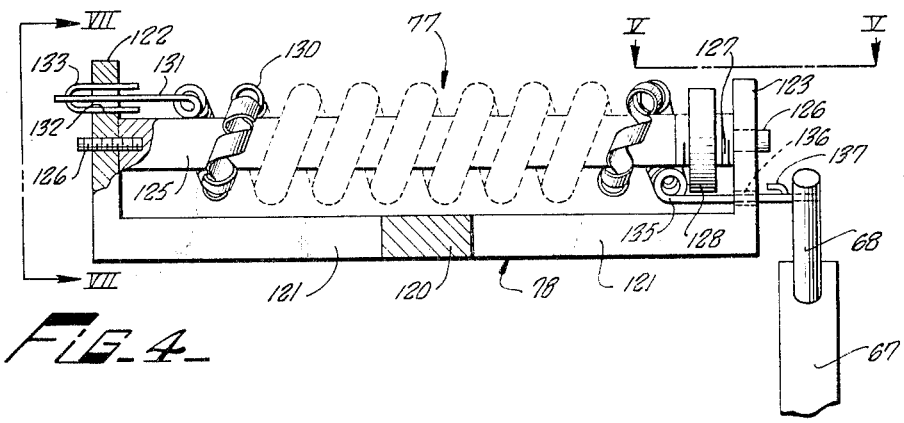
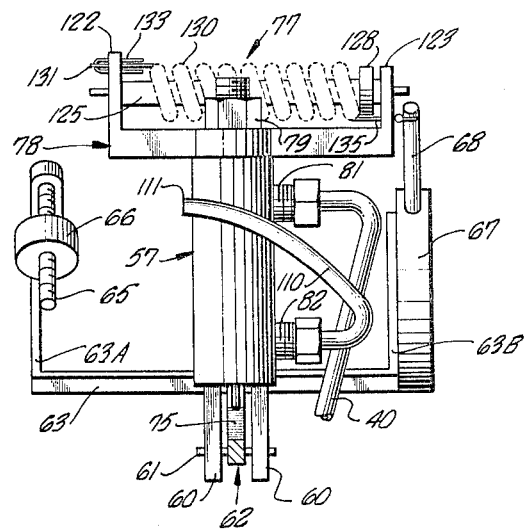
INVENTOR.
GEORGE KOCULYN
BY
Christie, Parker & Hale
ATTORNEYS.

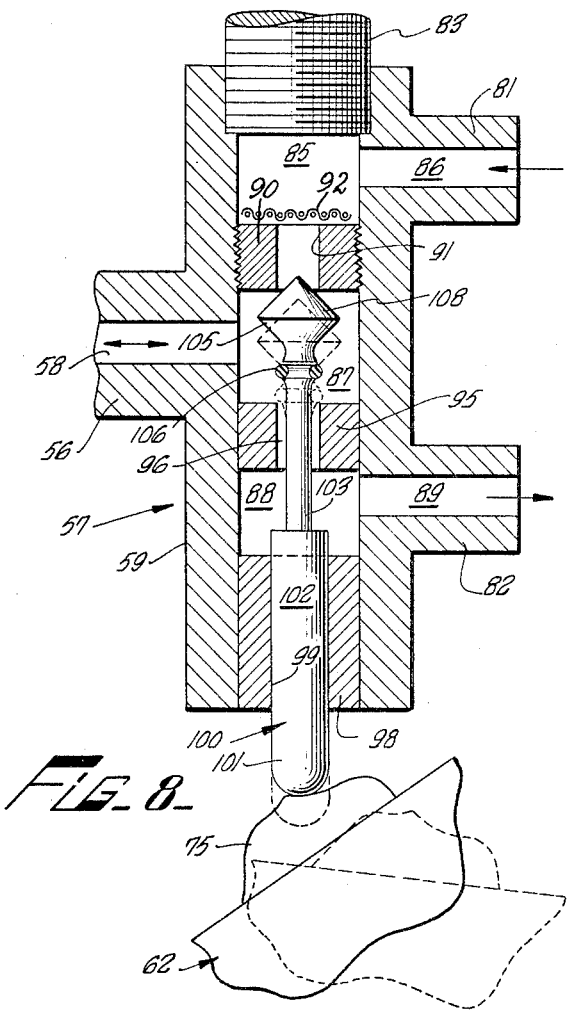

United States Patent Office 3,273,579
Patented Sept. 20, 1966

3,273,579
HYDRAULIC MECHANISM INCLUDING PILOT CONTROL RESPONSIVE TO ATMOSPHERIC CONDITIONS
George Koculyn, 3239 Altura Ave., La Crescenta, Calif.
Continuation of application Ser. No. 109,981, May 15, 1961. This application July 6, 1965, Ser. No. 480,217
9 Claims. (Cl. 137—80)

This application is a continuation of my copending application Ser. No. 109,981, filed May 15, 1961, and since abandoned entitled "Hydraulic Mechanism."

This invention relates to devices for producing reciprocating motion. More particularly, it relates to hydraulically powered reciprocal devices regulated by self-adjusting temperature responsive means.

This invention provides a hydraulically powered mechanism which develops reciprocating motion. While such reciprocating motion may be turned to many uses, a convenient use is in the operation of valves, either of the gate or globe type. This invention is considered, for purposes of explanation, as applied to a lawn sprinkler control connected to a valved pressurized water system which provides the operative power of the control.

Most sprinkling systems used in lawns, orchards, gardens, etc. must be manually operated and therefore posses the inherent disadvantage of being dependent on human judgment and inclination for their operation. To eliminate this element of uncertainty, sprinkler systems may be operated by control mechanisms adapted to operate the sprinklers responsive to the passage of time. Although possessed of the advantage of certainty of operation, such time responsive control means suffer the disadvantage of being insensitive to the atmospheric conditions which are, in effect, the criteria for determining when watering is required. Thus, if the time interval between operating periods is set so as to insure sufficient water under all humidity conditions, such a system will be wasteful of water when the humidity is high. This invention provides a sprinkler control which is operated in response to the same climatic conditions which necessitate the sprinkling process.

It has long been recognized, however, that the most efficient time to water grass or other plants is at the coolest time of the day. This is particularly critical when newly seeded lawns are to be watered. It is most desirable to water growing plants at a time when the addition of water to the plants does not provide a thermal shock to the plants. In such cases the water actually has the effect of warming the plants rather than cooling them. Also, when large expanses of lawn require sprinkling it is desirable that the area, if in a park or a cemetery, be watered when there are no people in the vicinity. Since such areas are generally devoid of population at the coolest time of day, which normally is early in the morning, a provision for operating an automatic sprinkler system during the coolest time of day is extremely desirable. This invention provides an automatic control for sprinkling systems which is responsive generally to climatic conditions dictating need for watering and which is collaterally responsive to a relative temperature condition.

Since weather patterns change from day to day, it is impractical to provide an automatic sprinkler control which will function in the manner desired if the temperature regulator is set to operate only at a single predetermined temperature. The low temperature on a particular day may be five or ten degrees above or below the low temperature on a succeeding day. A temperature control valve which is operable only at a given temperature may then remain inoperative over a long period of time even when the lawn which the sprinkler serves is in great need of water. This invention provides a self-adjusting temperature responsive means which is operable at one of the limits, preferably the lower limit, of normal climatic temperature fluctuations.

Generally speaking, this invention is utilized in conjunction with an existing hydraulic pressure source and provides hydraulically powered reciprocating motion means responsive to temperature. The invention includes a two-position control valve having an inlet connected to the pressure source. A piston having first and second pressure areas is provided and has the first area greater than the second. The second piston area is in continuous communication with the hydraulic pressure source; the first area is in communication with the pressure source only in response to the position of the control valve. The invention further includes a variable-centroid balance means which operates the control valve against the valve inlet pressure. Means are provided in association with the balance means and the control valve for varying the centroid of the balance means to cause the balance means to change position. The control valve, in turn, responds to change of position of the balance means to determine the communication between the first piston area and the hydraulic pressure source. Reciprocation of the piston results from the unbalanced forces existing between the first and second piston areas. Self-adjusting temperature actuated means operate directly against the balance means and govern the motion of the balance means when the centroid changes position to unbalance the balance means from one of its two stable positions. The variation in centroid location is generally dependent upon the nature of climatic conditions. The temperature-actuated means governing the operation of the control valve determining whether or not the control valve will operate is responsive to the high or low temperature limits of temperature cycles in the area of the apparatus.

The following detailed description and explanation of this invention is made in conjunction with the accompanying figures, wherein:

FIGURE 2 is a view of the invention as seen from the back in FIGURE 1 and showing the balance beam in the "unoperated" condition;

FIGURE 3 illustrates the control valve and the thermostat as seen from the left side of FIGURE 2;

FIGURE 4 is an enlarged cross-sectional view of the thermostat taken along the line 4—4 of FIGURE 2;

FIGURE 5 is a fragmentary plan view as taken along line 5—5 of FIGURE 4;

FIGURE 6 is an enlarged alternate embodiment of the freer end of the thermostat;

Figure 1:
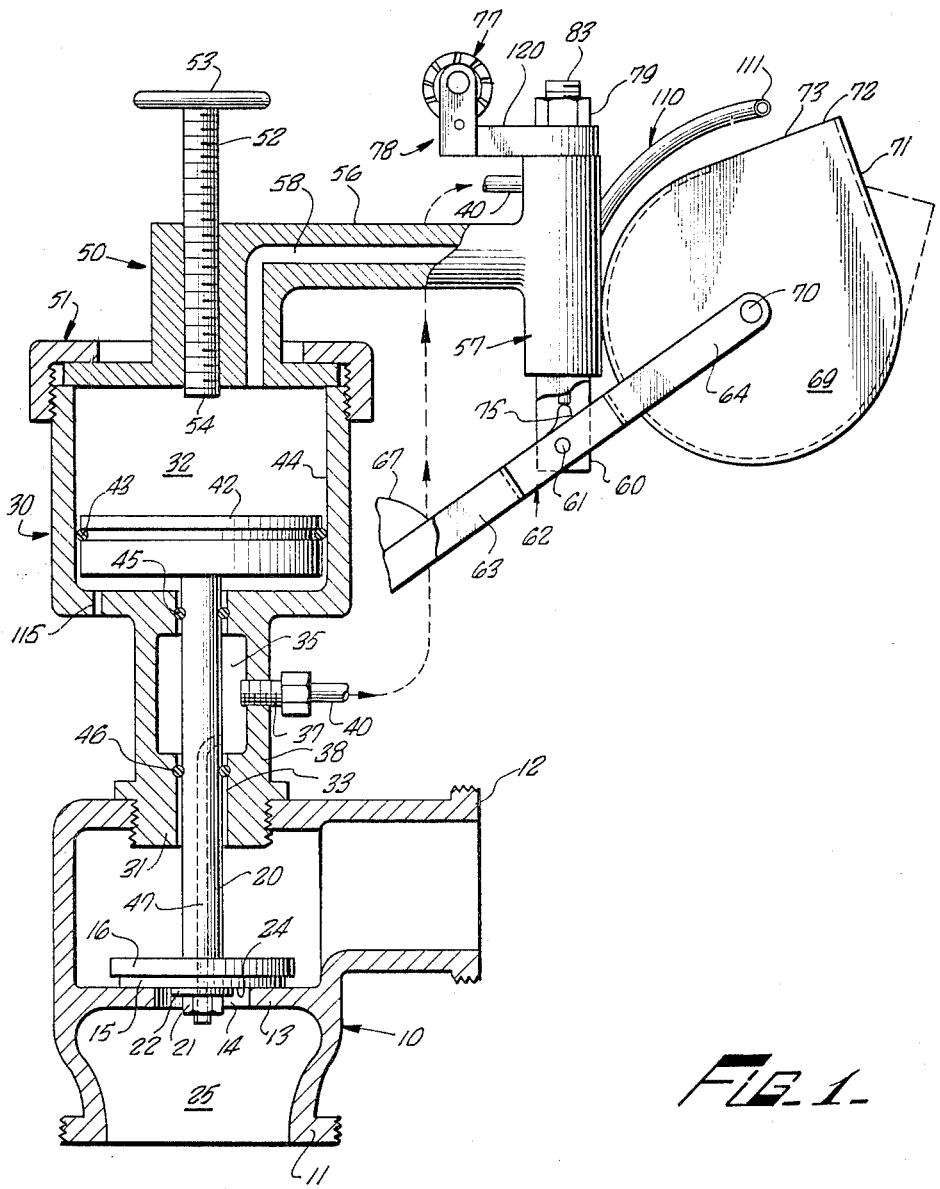
FIGURE 1 is an enlarged, partially cross-sectioned view of the control mechanism of this invention showing the balance beam in the "operated" position.

FIGURE 7 is an end view of the thermostat as taken along line 7—7 of FIGURE 4; and FIGURE 8 is an enlarged cross-sectional view of the pilot or control valve assembly, the portion to the left of the vertical center line having been swung 90° forwardly into the plane of the drawing for clarity of understanding of the operation; the pilot valve is shown in its operated condition in solid lines and in its normal or unoperated position in dashed lines.

Referring primarily to FIGURE 1, a globe valve 10 having an upstream or inlet coupling portion 11 and a downstream or exit coupling portion 12 is illustrated. A diaphragm or partition 13 having an aperture 14 therein separates the inlet and outlet portions 11 and 12, respectively, and serves a seat for the valve disc 15. Preferably the valve disc is fabricated of a resilient material and is carried by the mounting 16 secured to the end of a shaft 20 by a nut 21 and a washer 22. For use with this invention, the seating material 15 is on a downstream or exit side of a valve seat diaphragm 13 so that the under surface 24 of the valve closure 15 is exposed to high pressure fluid provided from a system connected to the inlet coupling portion 11 of the valve 10. For the purposes of explanation throughout this description, the cavity 25 between the valve seat diaphragm 13 and the inlet coupling portion 11 is referred to as a hydraulic pressure source. The actual mechanism for producing the pressure source can be removed from the globe valve 10 in the system. However, this pressure is manifested in the cavity 25.

Coaxially of the seat aperture 14, a threaded hole is provided above the valve seat 13 in the globe valve 10. Normally the valve stem fitting for the globe valve 10 is secured to the valve at this point. A piston housing 30 is secured in an aperture by a reduced diameter threaded lower portion 31. The housing 30 has a large diameter cylindrical cavity 32 in its upper end open with a reduced diameter cylindrical bore or shaftway 33 extending from the upper cavity 32 into the interior of the valve 10 above the valve seat 13. The shaftway 33 and the cavity 32 are concentric to one another and to the valve aperture 14. An enlarged diameter internally annular portion or cavity 35 is provided in the mid-length of the shaftway 33. A pipe fitting 37 is tapped into the reduced diameter lower portion 38 of the casting 30. A length of tubing 40 is secured to the pipe fitting or nipple 37.

The valve and piston shaft 20 extends from its lower end adjacent the valve aperture 14 to the upper open cavity 32 and carries a piston 42 at its upper end. An O-ring 43 circumferentially of the piston seals the piston to the side walls of the cavity 32. An O-ring 45 is carried by the housing 30 between the annular space 35 and upper cavity 32. A second O-ring 46 is installed in the housing between the cavity 35 and the lower portion 31 of the housing. These O-rings 45 and 46 seal the internal annular portion or cavity 35 relative to the reciprocating shaft 20. The shaft 20 is hollowed out axially from its lower end to adjacent the annular cavity 35 and communicates with the annular cavity 35 to form a duct 47 whereby fluid in the cavity 25 below the valve seat is in communication with the internal annular portion 35 and the duct 40 to operate the control valve 57 as described below.

A control valve and cylinder closure member 50 is secured to the upper open end of cavity 32 by a pipe union clamp ring 51 engaged to the threaded upper exterior of the piston housing 30. A piston stop 52 having a manual handle 53 at its upper exposed end is threaded into the control valve housing 50 and has its lower end 54 engageable with the upper surface of the piston 42. Stop 52 serves to limit the upper extent of travel of piston 42 and to regulate the flow through valve 10 when it is opened. As illustrated in FIGURE 1, the control valve housing 50 casting carries a lateral integral extension 56 extending from above the piston 42 to a control valve assembly 57. A duct 58 is provided in the control valve housing member 50 and extends from the cavity 32 through the arm 56 to the control valve cylinder 57 (see FIGURE 8). However, it is within the scope of this invention that the control valve cylinder 57 be mounted remotely from the piston housing 30 connected thereto by means of a duct similar to that illustrated at 40.

As illustrated in FIGURE 3, and also in FIGURES 1 and 2, a pair of pivot posts 60 depend downwardly from the control valve cylinder 59. A pivot pin 61 is journaled by the post 60 above the free ends thereof and supports a balance beam 62. Each end of the beam 62 is formed into a parallel armed yoke 63 and 64, each yoke being coplanar with the other and with the axis of the pivot pin 61. One arm 63A of the yoke 63 carries a threaded member 65 on which is mounted a fine-adjust balancing weight 66. The threaded member 65 is parallel to the plane of the yoke 63, and the beam 62 in general. The other arm 63B of the yoke 63 carries a permanent counterweight 67. A thermostat engaging trip pin 68 extends from the upper limit of the counterweight 67. A generally cylindrical horizontal axis bucket 69 is supported between the opposing arms of the yoke 64. Coaxial lugs 70 extend from either end of the bucket 69 and are journaled by the arm 64 in frictional engagement whereby the bucket 69 is adjustable into a range of positions as illustrated by the solid and dashed lines in FIGURES 1 and 2. The sides of the bucket 69 are formed into a tangential straight portion 71 to form a pouring lip 72 in conjunction with a bucket opening 73. A control valve actuating cam 75 is carried by the upper surface of the balance beam 62 in the vicinity of the pivot 61.

A self-adjusting thermostat 77 is carried by a thermostat mounting member 78 secured to the upper end of the pilot valve assembly 57 by a nut 79. The thermostat 77 and its function will be described in greater detail below.

Referring to FIGURE 8, the control or pilot valve assembly 57 is shown in detail. The valve comprises generally a cylinder 59 having an inlet nipple 81 at the upper end, and an outlet nipple 82 at the lower end of the cylinder 59 with a two-way flow connection 56 in the mid-length of the cylinder 59 being a part of the arm of the piston housing or casting 50. A short threaded stud 83 is engaged in the upper end of the cylinder 59 and carries the nut 79 securing the thermostat mounting member 78. The pilot valve assembly has three coaxial internal cavities. Cavity 85 is provided at the upper end of the cylinder 59 in communication with the duct 86 through the inlet nipple 81. A central cavity 87 is provided in communication with the duct 58, and a lower cavity 88 is provided in communication with the duct 89 of the outlet nipple 82. A washer or sleeve 90 having an annular bore 91 is threaded into the cylinder 59 and separates the cavities 85 and 87. The washer 90 provides an upper annular valve engaging shoulder at the lower end of bore 91. A sand and sediment filtering screen 92 rests on the upper surface of the washer 90. A second washer or sleeve 95 having a central annular bore 96 is provided internally of the cylinder 59 between the central cavity 87 and the lower cavity 88. The washer or sleeve 95 provides a second or lower annular valve shoulder at the upper end of bore 96. A valve guide sleeve bushing 98 is fitted into the lower portion of cylinder 59 and has a central annular bore 99 to receive the reciprocating valve piston 100.

The valve piston 100 itself has a rounded lower cam engaging end 101 on a relatively large diameter lower portion 102 engaged within the bore 99 of the bushing 98. A reduced diameter central valve portion 103 extends from the lower portion 102 through the bore 96 to an enlarged upper end 105 of the valve piston 100. The diameter of the central portion 103 is markedly less than the bore 96 of the central or middle washer 95. An O-ring 106 is fitted to the valve piston 100 adjacent the upper end 105 and engages the lower valve shoulder at the middle washer or sleeve 95 when the valve piston 100 is in its normal position, as indicated by the dashed lines of FIGURE 8. The upper end 105 of the valve piston 100 is formed into an upwardly convex conical configuration 108 having its apex coaxial with the cylinder 57. When the valve is in operated position, as shown by the solid lines of FIGURE 8, the cone 108 projects into the bore 91 of the upper washer 90, but does not make contact with the upper valve shoulder at the bore 91.

The duct 40 from the central annular cavity 32 of the piston housing 30 is connected to the valve inlet nipple 81 (see FIGURES 2 and 3). An outlet duct 110 is connected to the outlet nipple 82 and extends to a horizontal end portion 111 as illustrated in FIGURES 1 and 2. The open end 111 of the duct 110 is arranged above the opening of the bucket 69 when the bucket is in the position as illustrated in FIGURE 1.

The operation of the apparatus thus far described will be traced at this point, but it should be borne in mind that the operation of the thermostat 77, yet to be described, may be superimposed upon the operation of the control valve 57 and balance beam 62. One of the purposes of this invention is to provide a control valve and hydraulic system apparatus which is responsive to atmospheric conditions so that the apparatus of the invention may be utilized advantageously to automatically water lawns when watering is necessary. The balance beam 62 is shown in its normal or bucket-overbalanced condition in FIGURE 2. This corresponds to the beam position where bucket 69 is lowered by virtue of being filled with water such that the weight of the bucket 69 and its contents overbalances the fixed counterweight 67 and the adjustable fine counterweight 66. In this condition the cam 75 is clear of the cam follower portion 101 of the control valve piston 100, as illustrated by the dashed lines of FIGURE 8. With the balance beam 62 in this position, the valve piston 100 is at the lower limit of its travel such that the O-ring 106 engages the lower internal annular shoulder in the control valve 57. In this position, the cone 108 of the valve piston 100 is well clear of the upper shoulder of the annular bore 91 such that high pressure fluid is passed through the inlet duct 86 and through the duct 58 to communicate with the cavity 32 (see FIGURE 1) and the piston 42. This high pressure hydraulic fluid is available at the nipple 81 duct 86 from cavity 25 of the globe valve 10 through the piston shaft duct 47, the internal annular chamber 35 and the duct 40. Since the area of the upper end of the piston 42 is greater than the area of the valve seat 15 exposed to the cavity 25 by virtue of the aperture 14, there is a pressure unbalance between the valve seat 15 and the piston 42. Thus, the piston 42 is maintained in its downward limit of travel to hold the valve 15 closed.

After the water in the bucket 69 has evaporated by virtue of atmosphere conditions, the centroid of the balance beam 62 is changed so that the counterweight 67 governs and the balance beam 62 tips to the position illustrated in FIGURE 1. It should be noted at this point that the balance beam 62 in conjunction with the weights 66 and 67 and the bucket 69 is such that the centroid of the beam 62 is always above the pivot point 61 to provide an "over-center" balance mechanism. Preferably, the fine adjusting weight 66 is positioned so that when the last drop of water evaporates from the bucket 69 the centroid of the beam combination changes from a bucket overbalance condition to a counterweight overbalance condition. In other words, the centroid of the overbeam mechanism changes from the bucket side of the pivot 61 to the counterweight side and the beam tips in a rapid motion from the bucket balance position of FIGURE 2 to the counterweight position of FIGURE 1. When the beam tips to the counterweight position, the cam 75 engages the cam follower end 101 of the pilot valve piston 100, as illustrated in FIGURE 8. The cam 75 is clear of the valve stem when the beam 18 is in its bucket (dotted line) position of FIGURE 8, and the beam 67 is allowed to gain momentum in falling from the bucket overbalance position to the counterweight overbalance position so that an impact is applied to the cam follower 101 to unseat the valve 100 within the cylinder 57.

When the cam 75 is engaged with the follower 101, the valve stem 100 of the control valve is moved to the full-line position of FIGURE 8. In this case, then, the cone 108 is moved into close cooperation with the bore 91, but the cone 108 does not make contact with the upper annular shoulder in cylinder 59. The clearance between the bore 91 and the cone 108 is less than the clearance between the reduced diameter portion 103 of the valve 100 and the bore 96 at the lower shoulder. Because of the differences in the clearances between the bores 91 and 96, there is a greater tendency for the fluid in duct 58 to flow through the bore 96 than through the bore 91 against the inlet pressure in cavity 85. Accordingly, the pressure in the piston chamber 32 is reduced and the unbalance between the piston 42 and the valve seat 15 is reversed so that the high hydraulic pressure in the globe valve cavity 25 forces the piston 42 and its stem 20 into the upward limit of its travel adjacent the stop 54. As the piston 42 moves upwardly, the fluid entrained in the cavity 32 is vented through the duct 58 and outwardly of the valve 57 through the duct 110.

Initially, the pressure through the duct 110 is so great that the fluid is shot or squirted past the bucket 69. In other words, none of the fluid in the cavity 32 is dumped into the bucket 69. After the piston 42 has reached the upward limit of its travel, however, high pressure fluid from valve chamber 85 is dribbled through the control valve and out the duct 110 to fall into the bucket 69. The fluid does not flow rapidly through the control valve because of the restriction of the bore 91 by the cone 108. The spacing of the cone 108 from the bore 91 regulates the rate of flow of an amount of water sufficient to fill the bucket 69 to overbalance the beam 62 and thus indirectly determines the period which the control valve remains operated. When the bucket 69 has been filled with a predetermined amount of water, the centroid of the balance beam 62 moves so that the beam is in a bucket overbalance condition and the beam then tips to the condition illustrated in FIGURE 2. Because of the over-center nature of the pivoting of the beam 62, a predetermined amount of water must be added to the bucket 69 before the beam will tip regardless of the rotary position of the bucket 69.

The bucket 69 can be rotated about its supporting lug 70, as illustrated by the solid and dashed lines in FIGURES 1 and 2, so that on tipping to the position illustrated in FIGURE 2, a fraction of the water in the bucket is dumped from the bucket. The amount of water remaining, in conjunction with climatic conditions, determines the regularity at which the control will operate. In a given geographical area where climatic conditions are known, experience will dictate the amount of water which must be retained in the bucket so that a sprinkler served by valve 10 will function properly to water a lawn or garden.

The balance beam and control valve combination described above can be utilized conveniently to regulate a fire control system which is independent of electrical power. In such a case the bucket 69 is oriented so that all of the moisture therein is dumped when the bucket is in its overbalance condition so that the beam immediately returns to the operating condition of FIGURE 1.

It is possible that the balance beam 62 and control valve 57 of this invention can be utilized independently of a valve such as the globe valve 10. Referring to FIGURE 1, the apparatus illustrated includes an air vent 115 in the piston housing 30 opening to the under side of the piston 42. This is provided so that the cavity 30 does not become air bound when high pressure fluid is introduced against the upper face of the piston 42. A high pressure fluid source can be connected to the air bleed 115 and also to the control valve 57 at the inlet nipple 81. In this connection, the lower face of the piston 42 corresponds to the valve seat 15 determined by the aperture 14 since the area of the piston lower face is smaller in relation to that of the upper face by virtue of the shaft 20 making engagement with the piston 42. The shaft 20 is then connected to any mechanical apparatus operated by a reciprocating motion, even a gate valve rather than a globe valve. All that is required to provide an operative apparatus in conjunction with this invention is that two surfaces of differing area be in communication with a high pressure source. The surface having the larger area is connected to the high pressure source intermittently, as in a relation controlled by the control valve 57 and balance beam 62, while the smaller surface or area is in direct continuous communication with the high pressure hydraulic source. This type of apparatus has use where a mechanical motion is required without utilization of electrical power, particularly in explosive atmospheres where electrical apparatus is very difficult to render non-sparking. All that is required for power of the apparatus is a simple hydraulic connection.

It is to be noted that in FIGURE 1 the piston housing 30 is attached directly to the globe valve 10. The globe valve 10 can be a valve in an existing hydraulic or water system. Installation of the apparatus of this invention requires only that the stem of the globe valve be removed so that the housing 30 of the apparatus described can be substituted for the normal globe valve stem. As mentioned above, the control valve 57 and the balance beam 62 can be integrally connected to the piston housing 30 or they can be remote and connected thereto by a duct.

The operation of the control valve 57 as determined by the condition of the balance beam 62 is further regulated by a thermostatic control 77. As mentioned above, a thermostat mounting member 78 is secured to the upper end of the control valve 57 by nut 79 threaded on the stud 83. A horizontal arm 120 extends from below the nut 79 to terminate in a pair of laterally extending horizontal arms 121. An upstanding flange or tab extension 122, 123 is provided at each of the free ends of the lateral arms 121. A shaft 125 is secured by screws 126 between these lugs 122, 123 parallel to the arms 121. The end of the shaft 125 adjacent lug 123 is threaded, as at 127, and carries a threaded collar 128, the position of which determines the temperature range over which the thermostat is effective.

A bi-metal spiral coil is wound in a helix 130 around shaft 125 with opposite ends of the strip being straight. Referring to FIGURE 4 in particular, the left straight portion 131 of the thermostatic coil 130 extends through the aperture 132 in lug 122. A U-shaped spring clip 133 is passed through the straight length 131 of the bi-metal strip and has the legs of the clip 133 engaged frictionally against the interior of the aperture 132. The straight bi-metal portion 135 at the other or right end of the thermostatic coil 130 extends through an aperture 136 in the lug 123. A stop 137, illustrated in FIGURE 4 as an offset from the length 135, is provided in the straight portion 135 outwardly of the lug 123 for engagement with the outer end of lug 123. The stop 137 can also be provided in the form of a pin 138 (see FIGURE 6) in the free end of the straight portion 135. The extreme end of the straight bi-metal portion 135 is engageable with the pin 68 which extends from the counterweight 67. The configuration of the thermostat 77 results in the right straight portion 135 of the bi-metal strip being freer in aperture 136 than is the left straight end 131 within the aperture 132 because of the frictional engagement of the spring clip 133 with the aperture 132.

For purposes of example, let it be assumed that on exposure to a cooling atmosphere or environment the thermostatic helix 130 contracts between its ends. As the coil 130 contracts from the position shown in FIGURE 4, the stop 137 on the outer end of the straight portion 135 engages the lug 123. If the coil 130 is subjected to further cooling, then the end 135 can no longer move and the end 131 is then moved within the aperture 132 by slipping of the clip 133 against the sides of the aperture 132. Thus, if any contraction is sensed or is produced by cooling of the coil 130 the right end 135 of the thermostat moves first before the left end 131 is allowed to move. Heating of the helix 130 produces the same pattern of movement as the extreme right end of the helix 130 engages the collar 128. The position of the collar 128 on the threaded portion 127 of shaft 125 determines the amount of play or movement which the right end 135 of the coil 130 can undergo before the movement at this location is constrained and movement of the left end 131 is apparent. The amount of "play" of the right coil end 135 is thus adjustable as a function of temperature to determine the instances in which the self-adjusting compensator connection at end 131 becomes effective.

Applying the thermostatic control 77 to a lawn sprinkler valve control, the operation of the balance beam 62 can be regulated as a function of temperature independently of the rate of evaporation of moisture from the bucket 69. It is known that to be most efficient and effective lawns, orchards, etc. should be watered during the coolest time of day, normally just before sunrise, so that the plants are not thermally shocked by exposure to cold water. If the control valve 57 and balance beam 62 alone were installed in an orchard or in conjunction with a lawn sprinkling system, there would be no assurance that the sprinkler would function at this optimum time, since the balance beam 62 is not in itself sensitive to temperature conditions directly. As described above, the thermostat is mounted so that the freer end 135 of the thermostatic coil 130 engages the counterweight finger 68 in a latch type manner. If the balance beam 62 registers a counterweight overbalance by virtue of total evaporation from the bucket 69, the balance beam 62 would normally operate. However, the engagement of the freer end 135 of the thermostat 130 with the finger 68 prevents the beam 62 from moving from bucket position to counterweight position until the temperature conditions are such that the thermostat 130 contracts to release finger 68 from contact with the thermostatic strip portion 135. The control valve then operates in accord with the procedure described above until the drip-flow through the cylinder 59 fills the bucket 69 to return the beam 62 to its bucket position. Thereafter normal climatic conditions govern the rate of evaporation of the moisture retained in bucket 69 to determine the occasion for the next cycle of the control valve 57. The extreme tip 140 of the freer portion 135 of the thermostat is a continuation of helix 130 (see FIGURE 5). The beam 62 is movable from the counterweight overbalanced position to bucket overbalanced position without interference from the thermostatic control 77.

During operation of the thermostat 77 with the control valve 57 and the balance beam 62, the following conditions may well apply. It may be determined that the range between median daily high and median daily low temperatures is on the order of twenty degrees Fahrenheit (20° F.). However, the low temperatures in the area may vary within 20° F. and the high temperatures within 20° F. Thus, over a period of a month, the low temperatures in a given area may be in a range of from, say, 55° to 75° F. with the high temperatures being from 75° to 95° F. Let it further be assumed that the low temperature on a Monday morning is 60° F. During the afternoon of this particular Monday, the temperature reaches 85° F. (The collar 128 is set so that the freer end 135 of the thermostatic coil 135 can move unrestrictedly through a temperature range of 20°.) But the high temperature on this particular Monday is more than 20° above the morning low of 60° F. Accordingly, when the thermostat 77 reaches 80° F. the collar 128 is engaged by the coil convolutions 130 and, as the temperature rises to 85° F., the left end 131 of the thermostatic coil 130 then moves to accommodate the continued expansion of the coil 130.

For further illustration of the operation of the thermostat 77, let it be assumed that on the next morning, Tuesday morning, the temperature falls to 55° F. But this is 30° below the high of the previous afternoon. As the thermostat 77 cools, the stop 137 is engaged with the lug 123. As further contraction of the coil 130 is manifested, the left straight end 131 slips within the aperture 132. During Tuesday the right end 135 will move freely until the collar 128 is engaged at 75° F.;

further expansion of the coil 130 is manifested by movement of the clip 133. It is thus seen that the coil is self-adjusting within all temperature ranges and yet is set to operate within a predetermined temperature range as fixed by the collar 128 and the stop 137. If, at any time during this cycle, the balance beam 62 is in bucket-position counterweight-condition, the strip end 135 will release the beam finger 68 when the stop 137 abuts the flange 123. The sprinkler controlled by valve 10 is then operated until the bucket 69 fills to trip the beam 62 and shut off the control valve 57.

In the description above, it has been assumed that the counterweight finger 68 is freed from the thermostatic control 77 only on contraction of the coil 130. FIGURE 6 illustrates that the finger 68 can also provide release of the balance beam 62 at a high, rather than a low temperature, within a cycling temperature pattern. Here the right end 135 of the thermostatic coil strip is given a 90° turn to provide the tab 141. A downwardly opening notch 142 is provided in the tab 141. When the coil 130 is retracted with stop 138 abutting the lug 123 the counterweight finger 68 engages the tab 141. On expansion of the coil, however, the notch 142 moves relative to the finger 68 until the finger clears the tab 141 through notch 142 allowing the balance beam 62 to operate if it is in a counterweight overbalanced condition.

Thus, from the foregoing description it is apparent that the apparatus of this invention provides a mechanism which is responsive to climatic conditions and which can be utilized to control a valve in a hydraulic system. Since the piston 42 provides reciprocating motion, the apparatus can be used to control either a globe valve, illustrated in FIGURE 1, or a gate valve, as mentioned above. The operation of the control valve 57 is governed primarily by the atmospheric conditions since the relative humidity and temperature regulate the rate of evaporation of the water from bucket 69. The existence or non-existence of water in bucket 69 is determinative of the balance condition of the beam 62. The condition of the thermostat 77 becomes secondarily responsible for the operation of the control valve since it regulates the release of the balance beam 62 when the beam is in bucket-position counterweight-condition.

The operation of the balance beam 62 from counterweight position to bucket position is dependent upon the addition of a predetermined amount of water to the bucket 69. In a particular form of this invention it it may be required that the bucket 69 be filled so that the water level in bucket 69 corresponds to the axis of the cylinder of the bucket 69. However, because of the generally circular cross-section of the bucket 69, the bucket may be in a number of angular positions and still receive a fixed quantity of water corresponding to a fixed beam centroid position.

The time parameters in the operation of the valve 57 are also regulatable in two directions. The amount of time required for the bucket to change from its raised to its lowered position can be determined by the amount of clearance between the upper shoulder of valve 57 as formed by the lower surface of the washer 90 and the cone 108. This clearance determines the drip rate to fill bucket 69. The angular position of bucket 69 with respect to the balance beam 62 determines the amount of water retained in the bucket on transition from bucket-raised to bucket-lowered positions and thereby indirectly determines the amount of time which must pass before all the water is evaporated from the bucket 69.

While the invention has been described above in conjunction with specific apparati, applications, and configurations, it is to be realized that this has been by way of example only, and such are not intended to serve as limitations to the scope of this invention.

I claim:

1. Hydraulically powered means in association with an existing hydraulic pressure source for providing reciprocating motion responsive to temperature comprising a piston having first and second effective pressure areas with the first area being greater than the second, a two-position control valve, the second area and the inlet of the control valve being in continuous communication with the pressure source, variable-centroid balance means operating the control valve against the valve inlet pressure, duct means connected from the control valve for supplying water at a predetermined rate to the balance means when the control valve is in one valve position for varying the centroid of the balance means to cause the balance means to move from a first one of two stable positions in which the control valve is in said one position to the second of said two stable positions, the control valve responding to movement of the balance means from the first to the second stable position thereof to move to a second valve position to provide communication between the piston first area and the pressure source for reciprocation of the piston by unbalanced hydraulic pressure forces on the first and second areas, the balance means in the second stable position being responsive to removal of moisture from the balance means to unbalance same for movement thereof toward the first of said two stable positions, movement of the balance means from the second to the first of said stable positions effecting movement of the control valve from the second to said one valve position, and self-adjusting temperature actuated means directly operable against the balance means for governing the motion of the balance means from the second to the first stable positions thereof.

2. Hydraulically powered means according to claim 1 including a cylinder member for the piston, a sleeve portion of the cylinder member intermediate the first and second areas and having an enlarged internal diameter portion, a duct extending within the piston from the second area to the sleeve enlarged diameter portion, and a duct extending from the enlarged diameter portion through the sleeve for communication with the inlet of the control valve.

3. Hydraulically powered means according to claim 2 wherein the control valve comprises a cylinder having two spaced apart opposing internal annular shoulders intermediate the ends of the cylinder, including an upper and a lower shoulder, a second piston reciprocable in the cylinder having an enlarged upper end engageable with the lower shoulder and a reduced diameter portion defining a restricted flow path with the lower shoulder in said one valve position, the inlet to the control valve being to the cylinder above the upper shoulder, a connection from between the shoulders in communication with the first area, and an outlet duct extending from below the lower shoulder comprising the duct means connected from the control valve, wherein the control valve piston upper end is engaged with the lower shoulder when the control valve is in the second valve position to provide unrestricted connection between the control valve inlet and the first area to hold a globe valve closed, and wherein the control valve piston upper end is spaced from the lower shoulder to restrict the opening at the upper shoulder more than the opening at the lower shoulder when the control valve in said one valve position to relieve pressure on the first area for opening of a globe valve.

4. Hydraulically powered means according to claim 1 wherein the balance means comprises a beam pivoted between opposite ends adjacent the control valve, a weight fixed to one end of the beam, a horizontally cylindrical bucket mounted at the other end of the beam, wherein the centroid of the balance means is varied in one direction by addition of water to the bucket from the control valve through the duct means to unbalance the beam from the first to the second stable beam position, wherein the centroid is varied in the opposite direction by removal of water from the bucket to unbalance the beam from the second to the first stable beam position, and means for varying the amount of water retained in the bucket when the beam moves from the first to the second position.

5. Hydraulically powered means utilizing an existing pressure source for providing reciprocating motion responsive collaterally to climatic conditions and to temperature comprising a two-position control valve having an inlet connected to the source, a piston having first and second effective pressure areas with the first area being greater than the second, the second area being in continuous communication with the source and the first area being in communication with the source in response to the position of the control valve, variable-centroid balance means operating the control valve axially against the valve inlet pressure, duct means connected from the control valve for supplying water at a predetermined rate to the balance means for varying the centroid of the balance means in one direction to cause the balance means to change from one to the other of two positions, the centroid varying in the opposite direction in response to climatic conditions, to bias the balance means toward said one position, the control valve responding to change of position of the balance means for control of reciprocation of the piston by unbalanced forces between the first and second areas, and self-adjusting temperature actuated means directly operable against the balance means for limiting the motion of the balance means toward said one position when the centroid changes to unbalance the balance means from one of two stable positions and the temperature of the environment of the hydraulically powered means does not accord with a predetermined condition of temperature.

6. A hydraulic control responsive periodically to climatic conditions operated by a source of hydraulic pressure and comprising a first piston, a cylinder for the first piston having first and second spaced apart annular shoulders and having an inlet and an outlet, a balance beam pivoted adjacent one end of the cylinder, the beam including a bucket secured to one end of the beam and a counterweight secured to the other end of the beam, a cam on the beam in the vicinity of the pivot, a cam-engaging portion on the first piston extending through the one end of the cylinder, a second piston having first and second pressure areas, the first area being greater than the second area, the second area being in continuous communication with the pressure source, the duct means connecting the first area of the second piston to the pressure source through the first piston cylinder inlet, the relative positioning of the first piston and the shoulders controlling the flow pattern between the pressure source and the duct means and the outlet, a duct from the first piston cylinder outlet to adjacent the position of the bucket when the balance beam is overbalanced in the direction of the counterweight, and temperature operated means associated with the balance beam for governing operation of the beam in response to a predetermined portion of a cyclic temperature pattern, wherein the second piston first area is connected to the pressure source via the first piston and cylinder when the balance beam is in a bucket overbalanced condition, wherein evaporation of water from the bucket according to the climatic conditions puts the beam in a counterweight overbalanced condition, wherein the temperature means is operable directly against the beam to govern the shift of beam position after change from a bucket overbalanced to a counterweight overbalanced condition, wherein movement of the beam to the counterweight position engages the cam with the first piston cam engaging portion to move the first piston relative to the cylinder to restrict the connection between the pressure source and the first area and to vent the first area to the duct, whereby the second piston moves in response to the hydraulic pressure on the second area, and whereby the first area is placed in communication with the pressure source to reciprocate the second piston when the beam tips to the bucket overbalanced position to disengage the cam from the first piston.

7. Temperature controlled apparatus operated by a hydraulic pressure source for providing reciprocal motion comprising a piston having first and second pressure areas with the first area being greater than the second, the second area having continuous communication with the pressure source, a two-position triple-connection control valve having a first connection fluidly communicating with the pressure source, a second connection fluidly communicating with the first area, and a third connection, a balance beam having a counterweight fixed thereto at one end and a bucket at the other end, the beam having counterweight and bucket positions and overbalance conditions, the counterweight positions of the balance beam disposing the bucket adjacent the control valve third connection for filling the bucket with water through the control valve third connection, the bucket being disposed on the beam for receiving a predetermined quantity of water from the control valve third connection to overbalance the beam into the bucket position thereof and for dumping a selected fraction of the predetermined quantity from the bucket on movement of the beam to the bucket position, the remainder of the predetermined quantity being sufficient to maintain the beam in the bucket overbalanced condition, means on the beam for operating the control valve in response to motion of the beam, and temperature responsive latch means operably disposed adjacent the beam and selectively engageable directly with the beam for governing the change from bucket position to counterweight position when the beam is in counterweight condition, the condition of the valve corresponding to the bucket position of the beam providing fluid communication between the first and second control valve connections to hold the piston at one end of its range of travel, the condition of the valve corresponding to the counterweight position of the beam providing fluid communication between the three control valve connections with the fluid communication between the second and third connections being greater than the fluid communication between the first and second connections to relieve the pressure on the piston first area whereby the piston is driven to the other end of its range of travel, and wherein the amount of water flowing through the third connection to the bucket after travel of the piston to the other end of its range of travel and prior to movement of the beam into its bucket position defines the predetermined quantity of water and determines the time of operation of the apparatus before the piston is reciprocated in response to movement of the beam to its bucket position.

8. Apparatus according to claim 7 including a finger extending from the beam, and wherein the temperature responsive latch means comprises a bimetallic strip means supported adjacent the control valve, the strip means having at least one straight end, fixed means supporting each end of the strip and adapted to permit movement of the strip ends, the straight end of the strip being freer to move between two limiting positions thereof in response to expansion and contraction of the strip than the other end, the one end being engageable with the finger and having a predetermined amount of free motion, wherein expansion and contraction of the strip in an amount greater than the amount of free motion of the one end is manifested in movement of the other end of the strip, movement of the one end from one limiting position to the other limiting position disengaging said one end from the finger for movement of the beam from its bucket to its counterweight position.

9. Apparatus according to claim 8 wherein the bimetallic strip is arranged into a helix having oppositely disposed straight parallel ends, wherein the fixed support means includes spaced apart apertured lugs, the helix being disposed between the lugs, with the bimetallic strip ends passing through the lug apertures, the said other end of the strip including a spring clip frictionally engaged within the lug aperture at the said other end of the strip.

References Cited by the Examiner

UNITED STATES PATENTS

| | | | |
|---|---|---|---|
| 595,061 | 12/1897 | Gulland | 251—43 X |
| 1,312,721 | 8/1919 | Carrier | 239—65 |
| 2,004,194 | 6/1935 | Lacy-Mulhall | 239—65 X |
| 2,577,337 | 12/1951 | Lancaster | 137—78 X |
| 2,675,817 | 4/1954 | Hartlett | 137—80 |

WILLIAM F. O'DEA, *Primary Examiner.*

ISADOR WEIL, *Examiner.*

R. GERARD, *Assistant Examiner.*